United States Patent [19]

Wolf

[11] Patent Number: 6,024,500
[45] Date of Patent: Feb. 15, 2000

[54] TRANSCEIVER PACKAGE

[75] Inventor: Robert Karl Wolf, Fleetwood, Pa.

[73] Assignee: Lucent Technologies Inc., Murray Hill, N.J.

[21] Appl. No.: 09/069,044

[22] Filed: Apr. 29, 1998

[51] Int. Cl.[7] .................................................. G02B 6/36
[52] U.S. Cl. ................................ 385/92; 385/88; 385/91; 359/152; 359/163; 439/577
[58] Field of Search ................................. 385/92, 88–94; 359/152, 163; 439/577; 361/758

[56] References Cited

U.S. PATENT DOCUMENTS 5,329,428  7/1994  Block et al. ............................. 361/785
5,528,408  6/1996  McGinley et al. ....................... 359/152

*Primary Examiner*—Phan T. H. Palmer
*Attorney, Agent, or Firm*—Lester H. Birnbaum

[57] ABSTRACT

The invention is a transceiver package with reduced overall width and optical pitch. Separate circuit boards are provided for the laser with its associated circuitry and the photodetector with its associated circuitry. The boards are mounted to the sidewalls of the package housing so that they are essentially perpendicular to the base of the package and to the major surface of the mother board.

8 Claims, 3 Drawing Sheets

TRANSCEIVER PACKAGE

FIELD OF THE INVENTION

This invention relates to optoelectronics, and in particular to transceiver packages having a narrow optical pitch.

BACKGROUND OF THE INVENTION

As a result of the drive for ever-increasing packing densities, optical packages, especially transceiver packages, will desirably have smaller footprints, narrow widths, and utilize connectors with very narrow optical pitch. For example, a standard design utilizes the optical components and electronics on a single printed circuit board which is parallel to the mother board to which the package is mounted. Such designs use 1 inch wide transceiver packages with an optical pitch (the center-to-center distance between the laser and detector ports) 0.5 inches. While presently adequate, future designs call for a 0.54 inch width and 0.246 inch optical pitch. Meeting these stringent requirements was thought to require new types of optical components and/or optical fiber stubs. However, it is desirable to meet these requirements with commercial optical components and utilizing standard assembly techniques.

SUMMARY OF THE INVENTION

The invention is a transceiver package including a housing having first and second opposing side walls and a base portion adapted for mounting to a printed circuit mother board so that the base portion is essentially parallel to a major surface of the mother board. A first hybrid integrated circuit comprising a first circuit board and a laser is mounted to the first sidewall, and a second hybrid integrated circuit comprising a second circuit board and a photodetector is mounted to the second sidewall so that the first and second circuit boards are essentially perpendicular to the base portion.

BRIEF DESCRIPTION OF THE FIGURES

These and other features of the invention are delineated in detail in the following description. In the drawing.

It will be appreciated that, for purposes of illustration, these figures are not necessarily drawn to scale.

DETAILED DESCRIPTION

Figure 1:
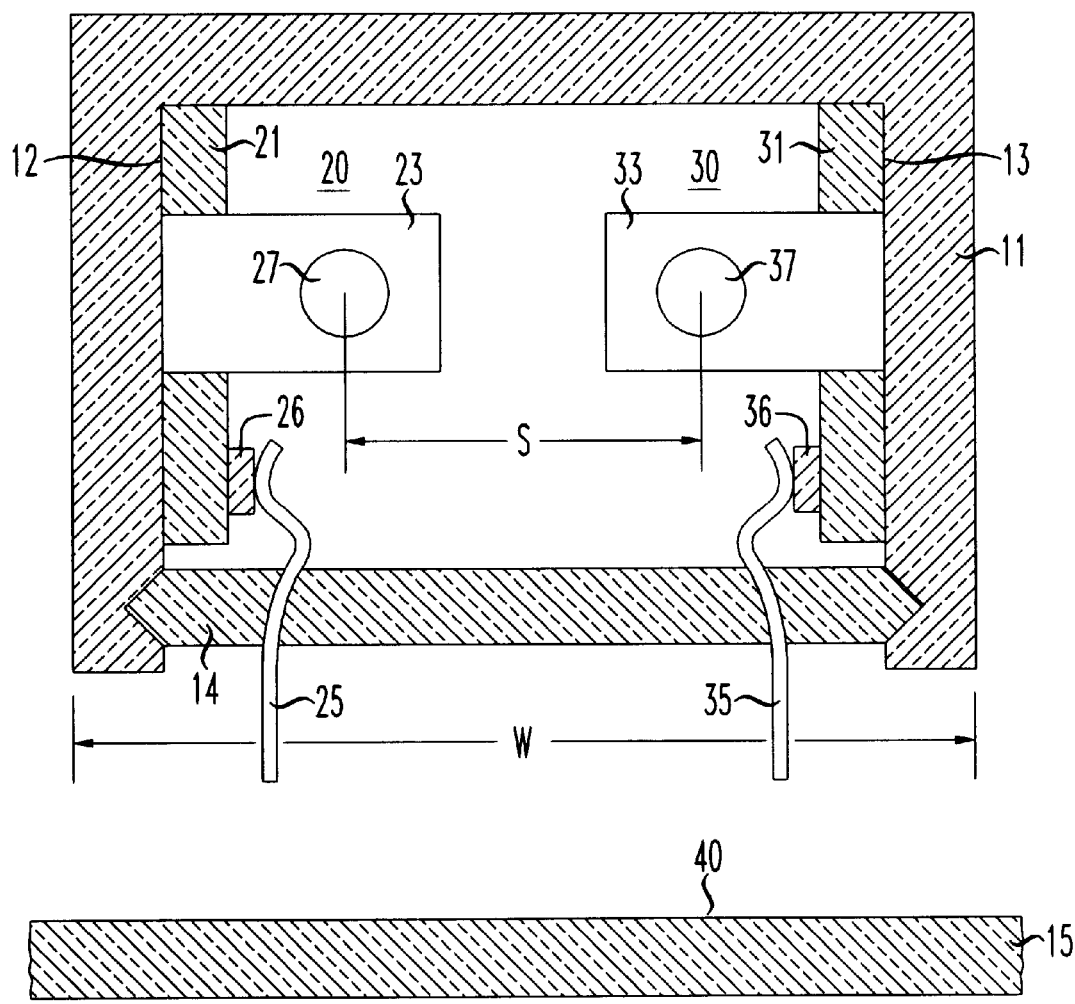
FIG. 1 is a cross sectional view of a transceiver package in accordance with an embodiment of the invention.
Figure 2:
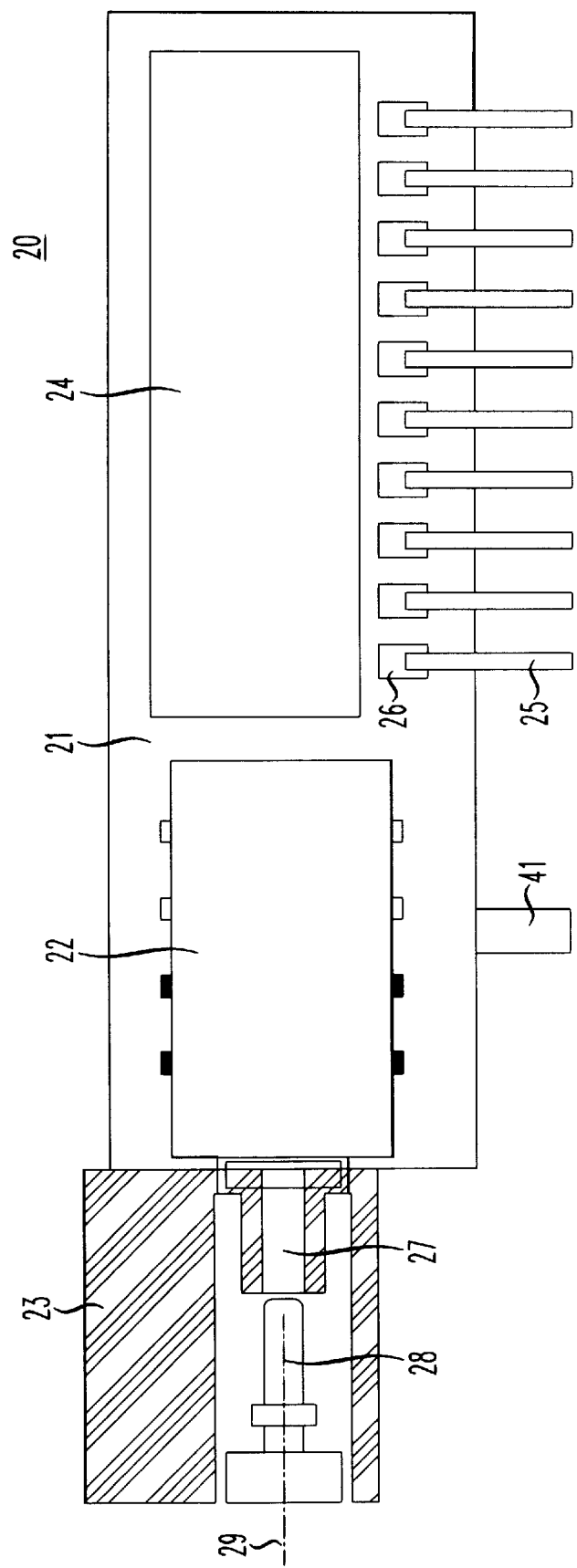
FIG. 2 is a schematic plan view of a hybrid integrated circuit in accordance with an embodiment of the invention.

FIG. 1 illustrates a transceiver package, 10, in accordance with an embodiment of the invention. The package includes a dielectric housing, 11, having first and second opposing side walls, 12 and 13, and a base portion, 14, adapted for mating with a printed circuit mother board, 15. A first hybrid integrated circuit, 20, comprising a first circuit board, 21, and a laser module, (22 of FIG. 2) is mounted on the first sidewall, 12, and a second hybrid integrated circuit, 30, comprising a second circuit board, 31, and a photodetector module (32 of FIG. 3) is mounted on the second sidewall, 13, so that the first and second circuit boards are essentially perpendicular to the base portion, 14. (A laser module typically includes a laser and an aligned lens, and a photodetector module typically includes a preamplifier, PIN photodiode and aligned lens.)

In more detail, the dielectric housing, 11, typically comprises a thermoplastic material, and in this embodiment has a width, w, of approximately 0.540 inches (13.71 mm). As further illustrated in FIG. 2, the transmitter hybrid circuit, 20, includes the laser module, 22, mounted near one end of the printed circuit board, 21 and extending beyond it, and electronic circuitry, illustrated by block 24, which comprises the laser drive circuitry, formed on the remainder of the board. A plurality of conductive leads, e.g., 25, is attached to respective metalized contact pads, e.g. 26, by standard means such as soldering to provide electrical connection to the circuitry, 24, which in turn drives the laser module, 22. A standard type of optical connector receptacle, 23, such as an LC-type receptacle, is molded as an integral part of the housing, 11. The receptacle, 23, includes an optical port, 27, for receiving an optical connector, 28, which connects to an optical fiber 29, so that light from the laser can be transmitted. (The optical port, 23, can alternatively be an integral part of the module 22.) The transmitter hybrid circuit, 20, is mounted to a mother board, 15, by insertion of the conductive leads, e.g., 25, into corresponding holes in the mother board. A mounting post, 41, extending from the circuit board, can also be inserted in the mother board to relieve stresses in the components. The board, 21, may be mounted to the sidewall, 12, by pin-in-hole attachment techniques. (See, e.g., R. K. Wolf, U.S. patent application Ser. No. 09/069,128 filed Apr. 29, 1998 and incorporated by reference herein)

In an exemplary embodiment, the laser module is a 1310 nm MQW edge emitting laser such as the Lucent 370-type laser, although other light emitting devices may be employed. Other types of standard receptacle, 23, can be employed in place of the LC-type of receptacle. The conductive leads, e.g., 25, can be solder plated BeCu and can be attached to the bonding pads, 26, by spring force or other means. (See, e.g., Wolf application cited previously).

Figure 3:
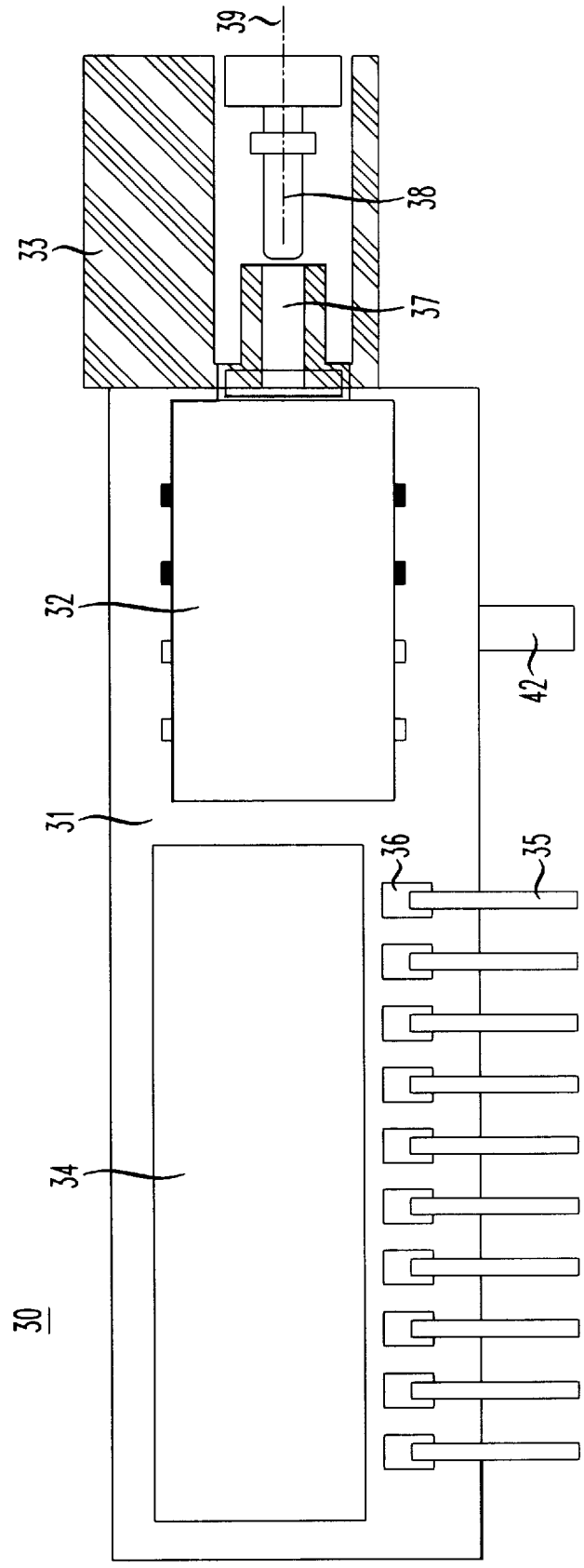
FIG. 3 is a schematic plan view of a hybrid integrated circuit in accordance with the same embodiment.

As further illustrated in FIG. 3, the receiver hybrid circuit, 30, includes the photodetector module, 32, mounted near one end of the printed circuit board, 31, and extending beyond it, and electronic circuitry, illustrated by block 34, which comprises the signal recovery circuitry, formed on the remainder of the board. A plurality of conductive leads, e.g., 35, is attached to respective metalized pads, e.g. 36, by standard means such as soldering to provide electrical connection to the circuitry, 34, which in turn recovers the signal received by the detector, 32. A standard type of optical connector receptacle, 33, such as an LC-type receptacle, is molded as an integral part of the housing, 11. The receptacle, 33, includes an optical port, 37, for receiving an optical connector, 38, which connects to an optical fiber 39, so that light from the fiber can be received by the detector, 32. (Again, the port 37 could be integral with the module 32.) The receiver hybrid circuit, 30, is also mounted to the mother board, 15, by insertion of the conductive leads, e.g., 35, into corresponding holes in the mother board. The board, 31, may be mounted to the sidewall, 13, by pin-in-hole attachment techniques in the same manner as the transmitter hybrid circuit.

In an exemplary embodiment, the photodetector module can be a preamplifier and PIN such as the Lucent 170-type detector, but other types may be employed. Again, other types of standard receptacle, 23, can be employed in place of the LC-type of receptacle. The conductive leads, e.g., 35, can, again, be solder plated BeCu and can be attached to the metalized pads, 36, by spring force or other means.

As illustrated in FIG. 1, the package, 10, is mounted to the mother board, 15, such that the base portion, 14, is essentially parallel to the major surface, 40, of the mother board, and the hybrid circuit boards, 21 and 31, are essentially perpendicular to the surface, 40, of the mother board. This orientation results in an overall width, w, of the package which is considerably less than standard packages where all components are placed on a single hybrid circuit board which is parallel to the surface of the mother board. In particular, the width of the package in this example is approximately 0.540 inches (13.71 mm). The present invention also reduces the optical pitch, s, to a value of approximately 0.246 inches (6.25 mm) which is significantly less than could be achieved with the prior art design. Thus, the package conforms to requirements for the next generation transceiver package without requiring new components or new processes. Further, the separation of the electronics, 24 and 34, for the laser and detector onto two boards, 21 and 31, reduces crosstalk between the electronics which is more critical of data rates greater than 1 Gigabit per second.

What is claimed is:

1. A transceiver package comprising:
    a housing having first and second sidewalls and a base portion adapted for mounting to a printed circuit mother board so that the base portion is essentially parallel to a major surface of the mother board;
    a first hybrid integrated circuit comprising a first printed circuit board and a laser mounted to the first sidewall;
    a second hybrid integrated circuit comprising a second circuit board and a photodetector mounted to the second sidewall so that the first and second circuit boards are essentially perpendicular to the base portion.
2. The package according to claim 1 further comprising at least two conductive leads mounted to respective metalized pads on the first and second circuit boards and extending through the base portion.
3. The package according to claim 2 wherein the leads are mounted to the pads by soldering.
4. The package according to claim 2 wherein the leads are mounted to the pads by a spring force exerted by the leads.
5. The package according to claim 1 wherein the package further includes optical ports aligned with the laser and photodetector for receiving an optical connector and optical fiber.
6. The package according to claim 5 wherein the center-to-center distance between the two ports is approximately 0.246 inches.
7. The package according to claim 1 wherein the first hybrid integrated circuit comprises electronic circuitry for driving the laser, and the second hybrid integrated circuit comprises signal recovery electronic circuitry.
8. The package according to claim 1 wherein the package has a width of approximately 0.540 inches.

* * * * *